United States Patent
Spivey et al.

(10) Patent No.: US 6,418,360 B1
(45) Date of Patent: *Jul. 9, 2002

(54) SENSOR STRUCTURE FOR MEASURING VEHICLE SUSPENSION RELATED INFORMATION

(75) Inventors: Thomas R. Spivey, West Linn; Donald M. Owen, Beaverton; Trev Hammon, Tualatin; J. Michael Halter, Beaverton; William H. Righter, Portland, all of OR (US)

(73) Assignee: Shockware, Tualatin, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/228,013

(22) Filed: Jan. 8, 1999

(51) Int. Cl.[7] .......................... G06F 17/00; B60G 23/00
(52) U.S. Cl. .............................. 701/29; 701/36; 701/37; 701/39; 280/5.501; 280/5.502; 73/11.04; 73/11.07; 340/443
(58) Field of Search ............................... 701/29, 36, 37, 701/38, 39; 280/5.513, 5.515, 5.519, 5.502, 5.508, 5.518, 5.504, 5.514, 5.507, 5.503, 5.5, 5.501; 180/218; 73/11.04, 11.07, 11.08; 177/136, 141; 340/438, 443, 580, 501

(56) References Cited

U.S. PATENT DOCUMENTS

| | | | |
|---|---|---|---|
| 3,855,841 A | 12/1974 | Lee ............................ 78/11.08 |
| 4,359,716 A | 11/1982 | Miyamaru et al. ........... 340/451 |
| 4,456,084 A | 6/1984 | Miller ......................... 177/141 |
| 4,468,050 A * | 8/1984 | Woods et al. ............. 280/5.514 |
| 4,468,739 A * | 8/1984 | Woods et al. .................. 701/37 |
| 4,506,354 A * | 3/1985 | Hansen ........................ 367/101 |
| 4,550,286 A * | 10/1985 | Holland et al. .............. 324/503 |
| 4,569,037 A * | 2/1986 | Seiferling .................... 367/108 |
| 4,600,215 A * | 7/1986 | Kuroki et al. ............... 280/707 |
| 4,630,226 A * | 12/1986 | Tanaka ......................... 73/627 |
| 4,634,142 A * | 1/1987 | Woods et al. ............. 280/5.503 |
| 4,691,792 A | 9/1987 | Shintani ......................... 177/1 |
| 4,749,210 A * | 6/1988 | Sugasawa ................. 280/5.519 |
| 4,809,179 A * | 2/1989 | Klinger et al. ................. 701/37 |
| 4,861,066 A | 8/1989 | Dernie ...................... 280/5.505 |
| 4,866,419 A | 9/1989 | Kyrtsos et al. ............. 340/443 |
| 4,884,644 A | 12/1989 | Reichow ..................... 177/137 |
| 4,908,767 A | 3/1990 | Scholl et al. ............... 701/220 |
| 4,969,529 A | 11/1990 | Reichow ..................... 177/137 |
| 5,025,666 A * | 6/1991 | Kobayashi et al. ........... 73/632 |
| 5,191,981 A | 3/1993 | Righter ....................... 600/523 |
| 5,259,246 A | 11/1993 | Stuyts ........................... 73/669 |
| 5,369,581 A | 11/1994 | Ohsuga et al. ................ 701/48 |
| 5,391,843 A | 2/1995 | Sato et al. .................. 177/141 |
| 5,479,825 A * | 1/1996 | Williams et al. .............. 73/644 |
| 5,522,468 A | 6/1996 | Dohrmann et al. ......... 177/136 |
| 5,528,496 A | 6/1996 | Brauer et al. ................. 701/32 |

* cited by examiner

Primary Examiner—Jacques H. Louis-Jacques
(74) Attorney, Agent, or Firm—Kolisch Hartwell Dickinson McCormack & Heuser

(57) ABSTRACT

A vehicle-mountable, suspension monitoring system produces suspension-analysis information which can be used to determine adjustments to a vehicle suspension. Sensor structure located adjacent the vehicle suspension is connected to a control/processing/display (CPD) unit located adjacent the vehicle operator. The sensor structure senses suspension related information and communicates the suspension related information to the CPD unit. The CPD unit receives the suspension related information and converts it to suspension-analysis information. The CPD unit stores the suspension-analysis information and displays it to the vehicle operator. Alternatively, the suspension-analysis information is downloaded from the CPD unit to a digital computer for display as waveform data.

5 Claims, 7 Drawing Sheets

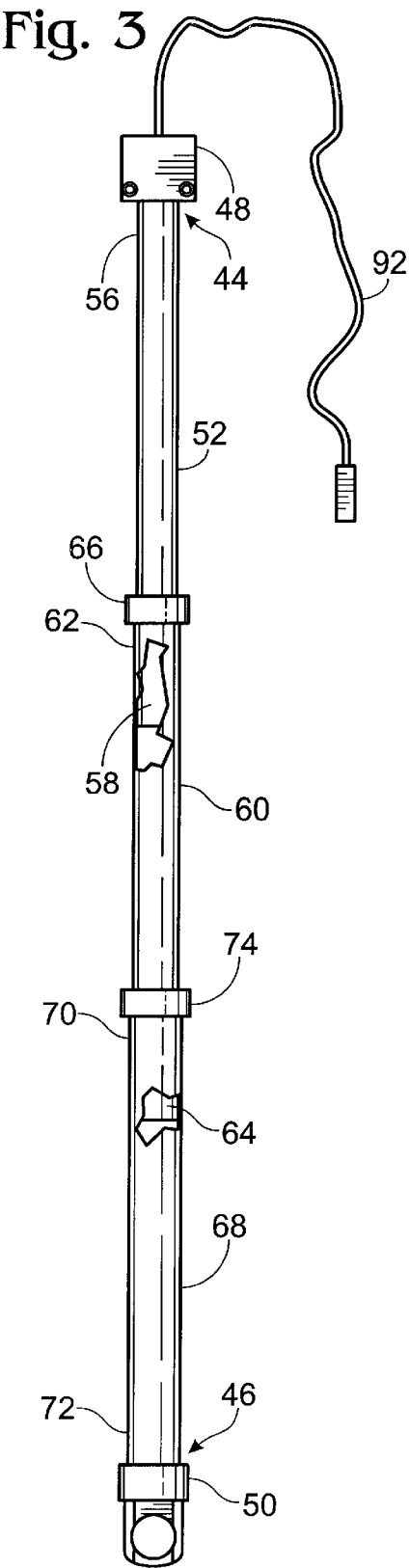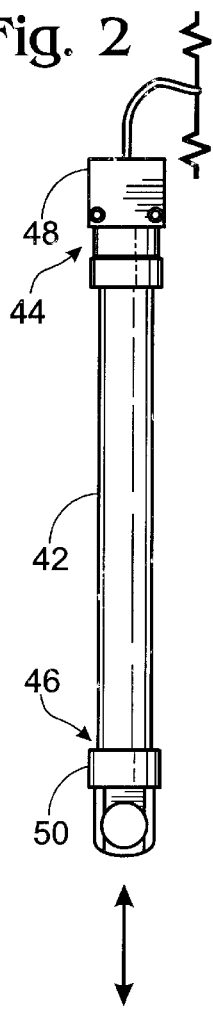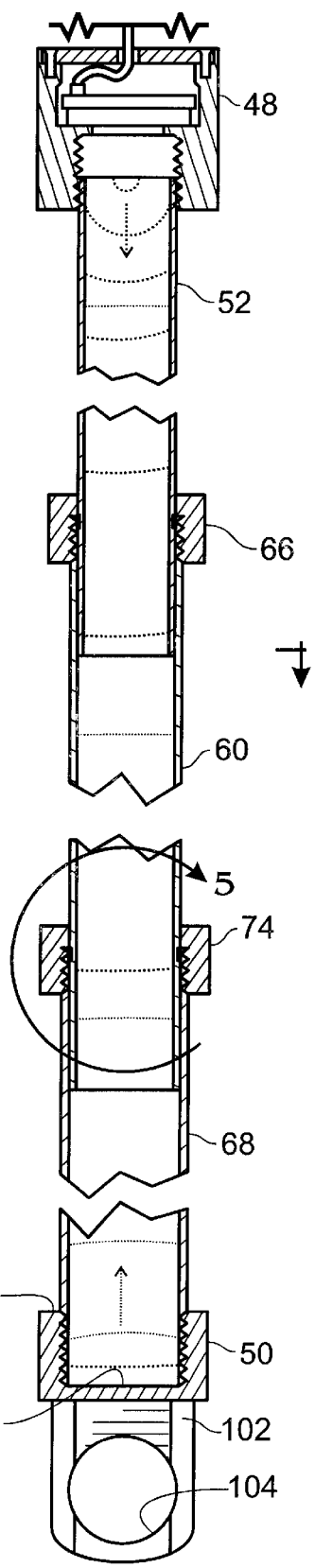

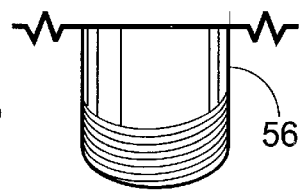
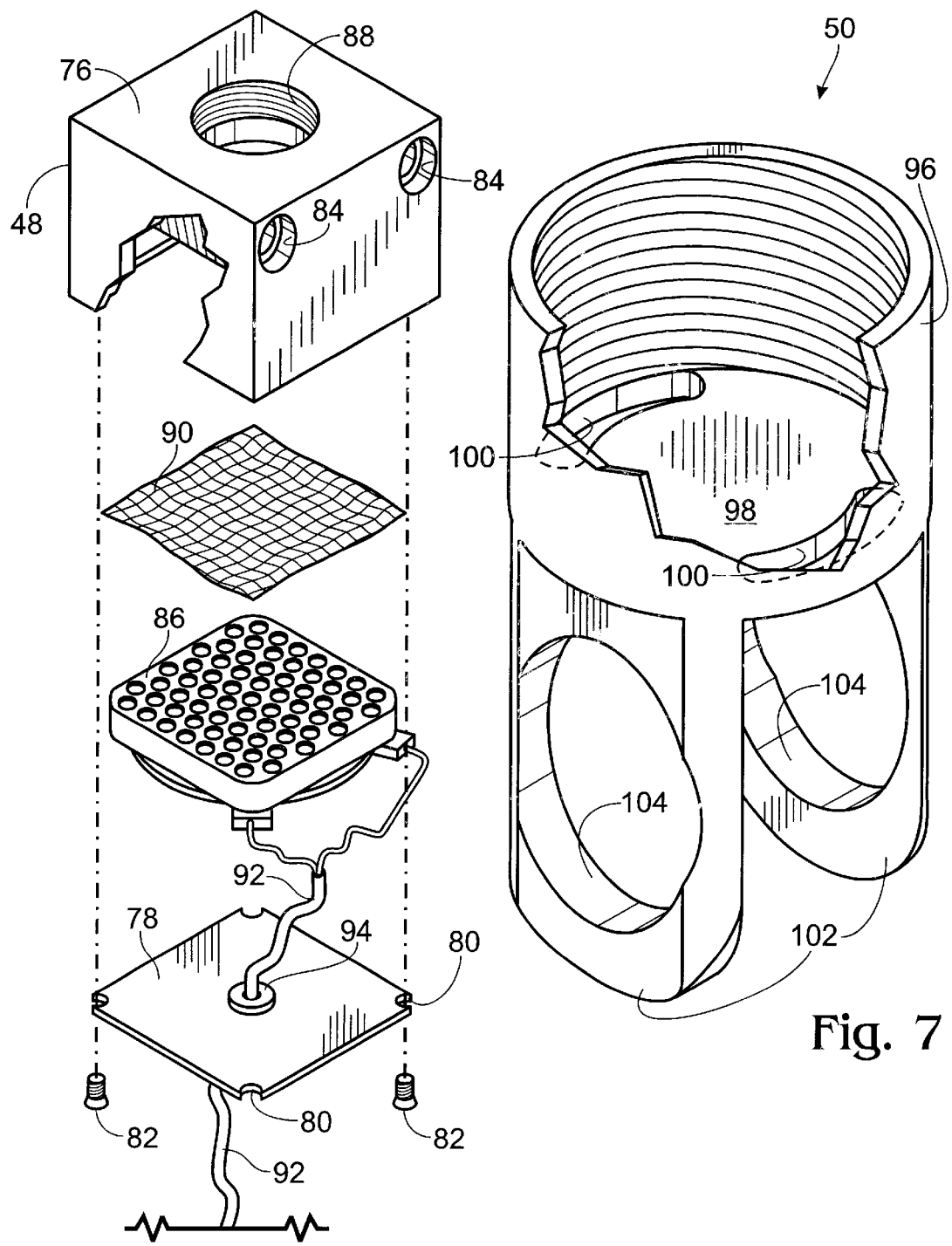

SENSOR STRUCTURE FOR MEASURING VEHICLE SUSPENSION RELATED INFORMATION

FIELD OF THE INVENTION

The invention relates generally to vehicle suspensions, and more particularly to an onboard system for monitoring the performance of a vehicle suspension.

BACKGROUND

A precision-tuned suspension can be the difference between winning and losing for a competitive motocross rider. Modern suspensions for motocross bikes employ both compression and rebound circuits allowing 12 to a 14 inches of travel to allow riders to perform substantial jumps and to traverse rough terrain. In addition, these suspensions are adjustable to allow optimization based on the weight of the rider, the layout of the racetrack, and the speed with which the rider negotiates the track. However, the importance of high-performance suspension is not limited to motocross racing. Top competitors in such sports as mountain biking, snowmobile racing, and off-road truck racing are fine-tuning their own suspensions to give them an advantage over their rivals. In addition, even non-competitive riders can improve their performance by customizing the suspension of their vehicle.

Unfortunately, it is not enough simply to purchase a vehicle with an adjustable, high-performance suspension. An improperly adjusted suspension can be a disadvantage rather than an advantage if the system fails to compress under impact, compresses too much, or rebounds too quickly. Therefore, a rider can distinguish himself or herself from competitors by understanding how the suspension is responding when the vehicle moves over a particular terrain, and how to make intelligent adjustments to the system to optimize its performance.

Typically, the compression circuit of a suspension should be adjusted to maximize use of the full range of travel without repeatedly undergoing full compression or "bottoming out." This will ensure that the greatest amount of force is absorbed by the suspension rather than the rider. The proper compression adjustment for a rider of a given weight will depend on the character of the terrain since a surface with many small bumps will require lower compression resistance than a surface with several large vertical jumps.

The rebound circuit controls the speed with which the suspension returns to an equilibrium condition after undergoing compression. Typically, the rebound circuit should be adjusted to ensure the system returns to equilibrium before the vehicle encounters the next irregularity in the terrain. However, if the system returns too quickly, it can cause the vehicle to bounce, much like a pogo stick.

While many riders understand the basic functioning of their vehicle suspensions, even the most experienced riders cannot determine necessary adjustments based solely on how the suspension 'feels' during operation. Because modern suspensions employ a variety of interacting components to insulate the rider from the forces sustained by the vehicle, it is often difficult to determine which component(s) is in need of adjustment. For example, a rider who feels the suspension repeatedly bottoming out, has no way of knowing if the problem is due to insufficient compression resistance or to slow rebound. Moreover, a suspected problem with the suspension at one wheel may actually be caused by an improperly adjusted suspension at another wheel.

The difficulty in determining what adjustments are needed cause many riders to avoid making any adjustments at all, fearing that they will only make matters worse. Other riders attempt to adjust their suspensions by trial and error. However, given the many possible adjustments which can be made, this can be an impractical approach, especially for professional riders who are continually faced with new racetracks. Another approach involves having a person act as a "spotter" to watch the vehicle as the rider traverses a track. The spotter attempts to detect whether the suspension is effectively using its full range of travel and whether it is rebounding to its equilibrium position between compressions. However, this method is difficult for even a highly trained technician.

Therefore, it would be desirable to have a system that mounts on a vehicle and provides the rider with information effective to analyze the performance of the vehicle suspension. Preferably, the rider could activate the system and make a test run by operating the vehicle over a selected course. The rider would then be able to adjust their suspension based on the characteristics of the selected course.

SUMMARY OF THE INVENTION

The invention provides a vehicle-mountable, suspension monitoring system for producing suspension-analysis information which can be used to determine adjustments to a vehicle suspension that includes a rebound circuit and a compression circuit. The suspension monitoring system includes sensor structure located adjacent a desired section of the vehicle suspension, and a control/processing/display (CPD) unit located adjacent the vehicle operator and connected to communicate with the sensor structure. The CPD unit includes a power source and is manually operable by a vehicle operator. The sensor structure is configured to sense suspension related information such as compression of the suspension, and to communicate the suspension related information to the CPD unit.

The CPD unit is configured to receive the suspension related information from the sensor structure and to convert the suspension related information into suspension-analysis information. The CPD unit stores the suspension-analysis information in an information storage device such as RAM. Additionally, the CPD unit is configured to display operator-selectable components of the suspension-analysis information to the vehicle operator for use in adjusting such vehicle suspension. Preferably, the operator-selectable components include percentage compression, inches of travel, rate of compression, rate of rebound, and full compression occurrences.

Optionally, the invented suspension monitoring system includes a remote digital computer configured to receive suspension-analysis information which is downloaded from the CPD unit. The digital computer is configured to permit further manipulation of the suspension-analysis information including displaying the suspension-analysis information as waveform data.

BRIEF DESCRIPTION OF THE DRAWINGS

FIG. 2 is a fragmentary, enlarged detail view of the sensor substructure depicted in FIG. 1 showing the sensor substructure in a fully retracted position.

FIG. 3 is an enlarged detail view of the sensor substructure depicted in FIG. 1 showing the sensor substructure in a substantially fully extended position with portions removed to show the telescoping assembly of the substructure.

FIG. 4 is a fragmentary, cross-sectional view of the sensor substructure of FIGS. 2 and 3 showing the telescoping assembly of the substructure and the propagation of the ultrasonic signal (illustrated by dotted lines) within the sensor substructure.

FIG. 6 is an exploded isometric view of the transducer housing.

FIG. 7 is a greatly enlarged isometric view of the endcap of the sensor structure with a portion of the threaded collar removed to show the target surface.

DETAILED DESCRIPTION OF THE PREFERRED EMBODIMENT

Figure 1:
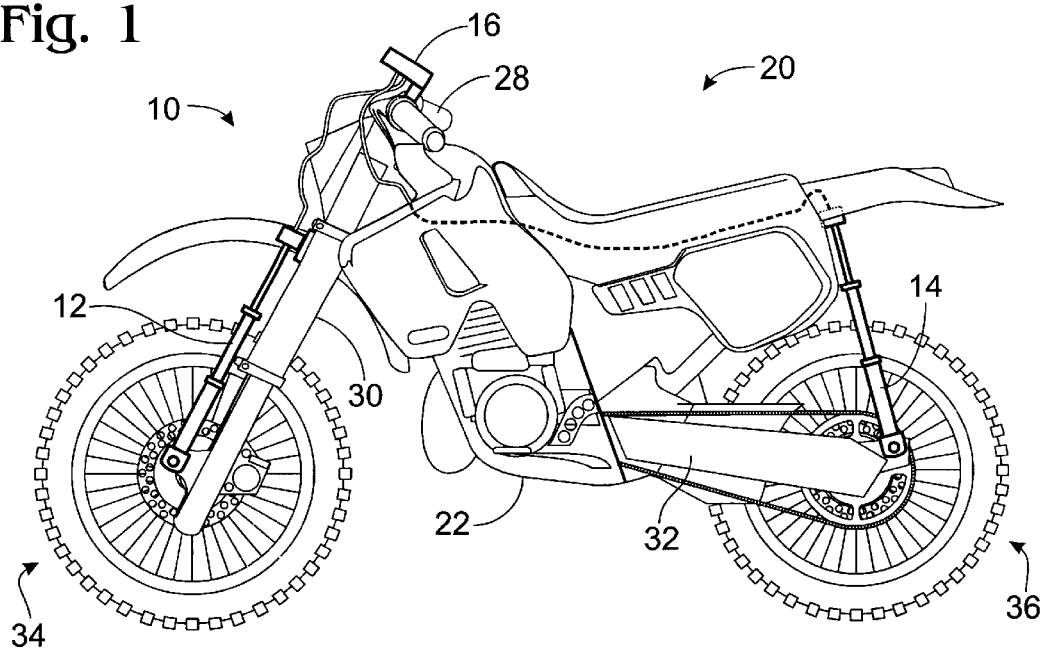
FIG. 1 is a side elevation view of an vehicle monitoring system according to the present invention mounted on a motorcycle.

A suspension monitoring system according to the present invention is shown generally at 10 in FIG. 1. Suspension monitoring system 10 includes a control/processing/display (CPD) unit 16 connected to communicate with a sensor structure which may contain a plurality of sensor substructures 12 and 14. During a first phase of operation, system 10 is mounted on a vehicle such as motorcycle 20 and configured to measure and display suspension-analysis information to the vehicle operator for use in adjusting the suspension of the vehicle. During a second phase of operation to be discussed in more detail below, CPD unit 16 is connected to a digital computer and the suspension-analysis information is downloaded to the digital computer for processing and display as waveform data.

Although system 10 is shown mounted on a motorcycle, it will be appreciated that the invention is not limited to use with motorcycles and that system 10 may be mounted on other types of vehicles which have suspensions including cars, trucks, bicycles, snowmobiles, all-terrain vehicles (ATV's), etc. Therefore, while the invention is described below in the context of a motorcycle, it will be understood that such description includes the use of the invented suspension monitoring system with all such vehicles.

Motorcycle 20 typically includes a rider support frame 22 which is suspended from a front wheel assembly 34 and a rear wheel assembly 36 by a motorcycle suspension. The motorcycle suspension includes a front suspension assembly 30 connected to couple rider support frame 22 to front wheel assembly 34, and a rear suspension assembly 32 connected to couple the rider support frame to rear wheel assembly 36.

Both front suspension assembly 30 and rear suspension assembly 32 include a compression circuit (not shown) to at least partially absorb the impact felt by the rider when the motorcycle passes over uneven terrain. Typically, the compression circuits include springs which compress or expand to allow front wheel assembly 34 and rear wheel assembly 36 to move in relation to rider support frame 22. Additionally, both assembly 30 and 32 include rebound circuits (not shown) which act to dampen the rebound of the compression circuits. Typically, the rebound circuits include shock absorbers which prevent the rider support frame from repeatedly bouncing on the compression springs after the motorcycle has passed over a surface irregularity.

While described above as a combination spring and shock absorber, the suspension assemblies may take other forms which are well known in the art. In any event, the invented suspension monitoring system is configured to measure and display information regarding the performance of the suspension, such information being usable to determine adjustments to the suspension.

As shown in FIG. 1, suspension monitoring system 10 is mounted on motorcycle 20 to measure suspension related information regarding front and rear suspension assemblies 30 and 32, and to display suspension analysis information to the rider on CPD unit 16. Preferably, front and rear sensor substructures 12 and 14 are located adjacent front and rear assembling 30 and 32, respectively, while CPD unit 16 is located on handlebar 28 adjacent the rider.

Turning attention now to the sensor structure, FIGS. 2–7 show a preferred embodiment of sensor substructures 12 and 14, each of which includes a variable length conduit 42 having a proximal end 44 and a distal end 46. Each sensor substructure also includes a transducer housing 48 adjacent proximal end 44, and an endcap 50 adjacent distal end 46. Preferably, conduit 42 includes a plurality of hollow, concentric, telescoping segments sized and configured according to the intended application.

As shown in FIGS. 2–4, conduit 42 preferably includes a first segment 52 having a proximal end 56 and a distal end 58, a second segment 60 having a proximal end 62 and a distal end 64, and a third segment 68 having a proximal end 70 and a distal end 72. Segments 52, 60 and 68 are substantially cylindrical, elongate tubes which are constructed to telescope from a compressed configuration to an extended configuration and vice versa, as shown in FIGS. 2 and 3. Accordingly, first segment 52 is sized to fit within second segment 60 in a sliding relationship. Similarly, second segment 60 is sized to fit within third segment 68 in a sliding relationship.

Proximal end 62 of second segment 60 is threaded to receive locking collar 66. Likewise, proximal end 70 of third segment 68 is threaded to receive locking collar 74. As shown in the enlarged detail view of FIG. 5, second segment 60 includes two retaining rings 65 which slightly protrude about the circumference of distal end 64. The outside diameter of retaining rings 65 are slightly larger than the inside diameter of flange 75 on collar 74 such that when conduit 42 is extended, flange 75 prevents the second segment from disengaging from the third segment. Similarly, first segment 52 includes retaining rings on distal end 58 which overlap a flange on collar 66 to prevent the first segment from disengaging from the second segment.

Preferably, telescoping segments 52, 60 and 68 are constructed of aluminum or some other lightweight, yet rigid material suitable for use under a variety of weather conditions. Alternatively, variable length conduit 42 is constructed as one or more tubes of a stretchable material such as rubber. In any event, conduit 42 acts as a bidirectional signal path between transducer housing 48 and endcap 50.

In a preferred embodiment shown in FIG. 6, transducer housing 48 includes a base 76 capped by a cover plate 78. Cover plate 78 is secured to base 76 by screws 82 which pass through holes 80 of the cover plate and into the base. Opposite cover plate 78, base 76 includes a threaded signal port 88. An ultrasonic transducer 86 is disposed within housing 48 adjacent signal port 88. Transducer 86 includes a sensor cable 92 which passes through a cable feed-through hole 94 in cover plate 78. Preferably, base 76, cover plate 78, and feed-through hole 94 are constructed and assembled to prevent contamination of transducer 86 by dirt, water, etc. Mounting holes 84 are provided to attach the transducer housing adjacent the suspension.

Proximal end 56 of first segment 52 is threaded to be received into signal port 88 of transducer housing 48. Thus transducer 86 is disposed adjacent proximal end 44 of conduit 42 so that an ultrasonic signal transmitted by the transducer propagates along the interior of the conduit. Preferably, conduit 42 is coupled to housing 48 so as to prevent contamination of transducer 86 by dirt, water, etc. In an alternative embodiment, a signal dampener 90 is disposed between the transducer and the conduit to attenuate the ultrasonic signal. Signal dampener 90 may be constructed of any material suitable to transmit an ultrasonic signal at a reduced amplitude. In one embodiment, an inexpensive perforated paper material is used such as a common dish wipe.

As shown in FIG. 7, endcap 50 includes a cylindrical, threaded collar 96 which receives the threaded distal end 72 of third segment 68, and a pair of mounting prongs 102 which define holes 104. Disposed between collar 96 and prongs 102 is target surface 98 which at least partially covers distal end 46 of the conduit. Preferably, target surface 98 includes one or more air vents 100 which facilitate the telescoping movement of the conduit by allowing air to flow into and out of the conduit when it is extended or retracted. In the preferred embodiment, air vents 100 are arcuate channels formed in the perimeter of target surface 98. In an alternative embodiment, air vents 100 are formed in one or more of the telescoping segments. However, in such alternative embodiment, the air vents are preferably formed to ensure that an ultrasonic signal transmitted by the transducer propagates at least partially within the conduit.

Figure 8:
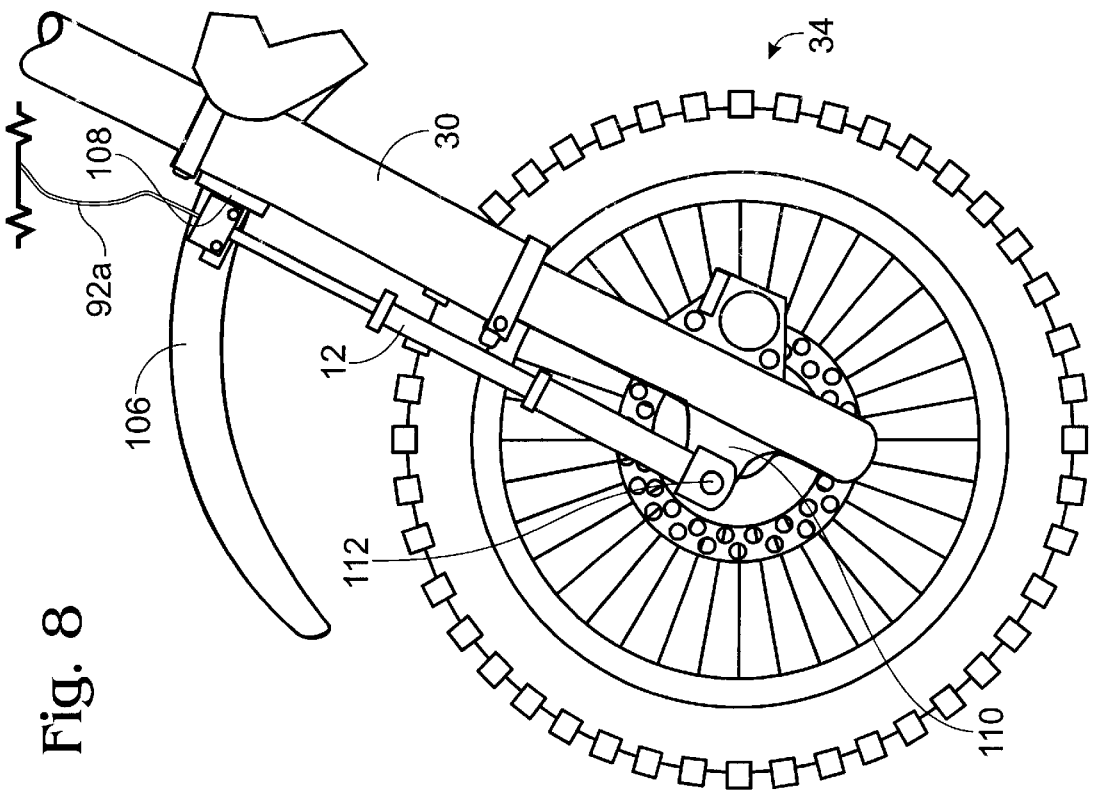
FIG. 8 is a fragmentary, enlarged side view of the motorcycle depicted in FIG. 1 showing a front sensor substructure connected to measure the performance of the front suspension assembly of the motorcycle.

Referring now to FIG. 8, proximal end 44 of front sensor substructure 12 is preferably connected adjacent front suspension assembly 30 at mounting block 108. Alternatively, proximal end 44 is connected to front fender 106 or some other location adjacent rider support frame 22. Screws (not shown) may be inserted through holes 84 to attach proximal end 44 to either mounting block 108 or front fender 106. Distal end 46 of front sensor substructure 12 is connected to front wheel assembly 34, preferably at mounting bracket 110. Bracket 110 includes a hole (not shown) which aligns with holes 104 such that locking pin 112 passes through holes 104 and the bracket hole to couple the distal end of the conduit to the front wheel assembly.

Figure 9:
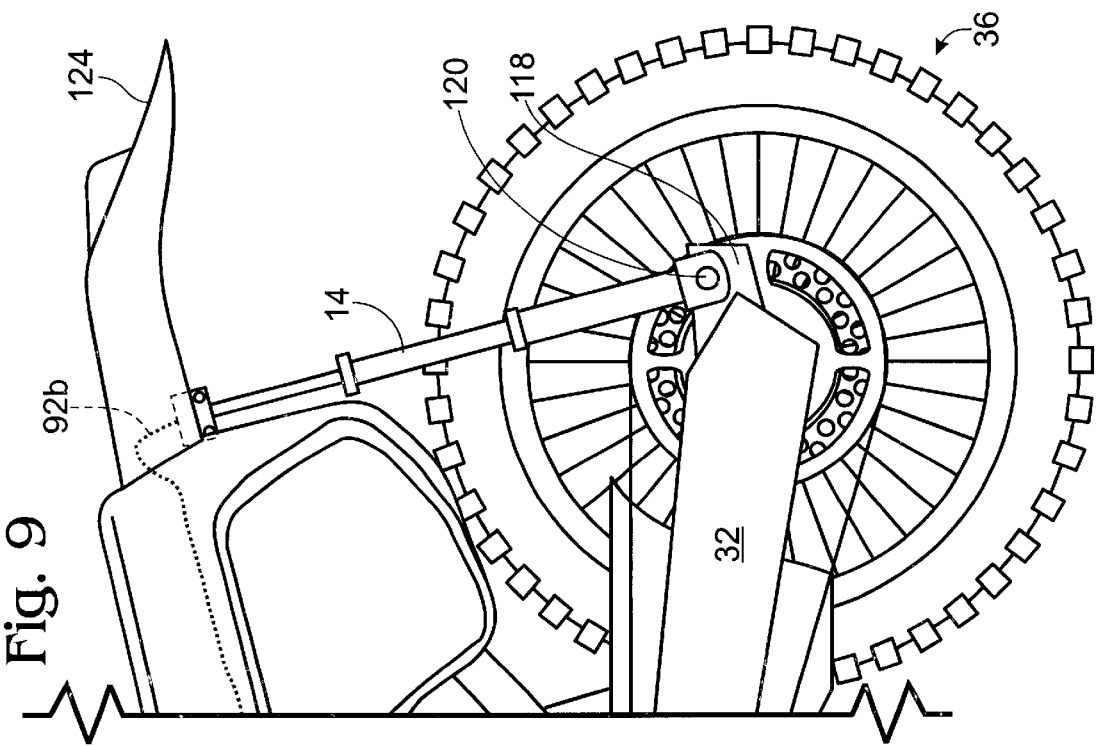
FIG. 9 is a fragmentary, enlarged side view of the motorcycle depicted in FIG. 1 showing a rear sensor substructure connected to measure the performance of the rear suspension assembly of the motorcycle.

FIG. 9 shows the similar location of the rear sensor substructure adjacent rear suspension assembly 32. Proximal end 44 of rear sensor substructure 14 is preferably connected adjacent rider support frame 22 at rear fender 114. Screws (not shown) may be inserted through holes 84 and into bracket 116. In the embodiment of motorcycle 20 shown in FIG. 9, rear suspension assembly 32 is a pivoting type suspension rather than a piston type suspension. In the event rear suspension assembly 32 is a piston type suspension, proximal end 44 is alternatively connected adjacent assembly 32 at a mounting block such as mounting block 108. In any event, distal end 46 of rear sensor substructure 14 is connected to rear wheel assembly 36, preferably at mounting bracket 118. Locking pin 120 passes through holes 104 and a hole (not shown) in bracket 118 to couple the distal end of the conduit to the rear wheel assembly.

As described above, front sensor substructure 12 and rear sensor substructure 14 are located adjacent front suspension assembly 30 and rear suspension assembly 32, respectively, to sense suspension related information such as compression and/or rebound information of the motorcycle suspension during a desired period of motorcycle operation. For clarity, the discussion below focuses on the front sensor substructure. However, it will be understood that the rear sensor substructure functions identically to the front sensor substructure and, thus, the discussion below applies equally to both substructures.

During a period of motorcycle operation, the rider will typically traverse several obstacles in the terrain such as holes, dips, bumps, hills, etc. Depending on the speed at which these obstacles are traversed, front suspension assembly 30 will respond to lessen the impact of the obstacles on the rider by alternately compressing and contracting, thus reducing the vertical motion translated to rider support frame 22. When mounted as described above, front sensor substructure 12 senses the compression and rebound of assembly 30 and communicates compression and rebound information to CPD unit 16.

In the preferred embodiment, transducer 86 repeatedly measures the distance to target surface 98, which changes as conduit 42 retracts with the compression of the front suspension assembly and extends with the rebound of the front suspension assembly. As illustrated schematically in FIG. 4, transducer 86 transmits an ultrasonic detection pulse or signal (indicated by dotted lines) which propagates along conduit 42 to target surface 98 which is configured to receive the detection signal and return a response signal. Preferably, target surface 98 is constructed of a material to reflect the detection signal back to transducer 86. Alternatively, target surface 98 is configured to generate a new signal in response to the detection signal. In any event, the response signal propagates back along conduit 42 until it is received by transducer 86.

Due to the finite speed of sound in air, there will be a delay between the moment that the transducer transmits the detection signal and the moment it receives the response signal. This time delay is proportional to the distance between the transducer and the target surface. As front suspension assembly 30 is compressed, conduit 42 retracts and the distance between transducer 86 and target surface 98 decreases. Consequently, the time delay between transmission of the detection signal and reception of the response signal also decreases. Likewise, as front suspension assembly 30 rebounds, conduit 42 extends and the distance between transducer 86 and target surface 98 increases. As a result, the time delay between transmission of the detection signal and reception of the response signal also increases.

Transducer 86 communicates the compression and rebound information to CPD unit 16 by generating output voltage signals simultaneously with the transmission of the detection signal and the reception of the response signal. The output voltage signals are communicated to the CPD unit via sensor cable 92*a*. (In the case of rear sensor substructure 14, the output voltage signals are communicated to CPD unit 16 via sensor cable 92*b*). In the preferred embodiment, cable 92*a* includes a weather-tight union connector (not shown) which allows the sensor substructure and the CPD unit to be connected and disconnected quickly. It will be appreciated that the output voltage signals may take any form such as discrete pulses, frequency-modulated bursts, etc.

As discussed above, the time delay between the output voltage signals corresponds to the distance between the transducer and the target surface. After reception of the output voltage signals, the CPD unit calculates the distance between transducer 86 and target surface 98 by multiplying the time delay between the output voltage signals with the speed of sound in air. (Distance=time delay*speed of sound.)

If each pair of detection signal and response signal is considered as a single sample, it will be appreciated that a greater sample rate will yield a higher resolution of compression and rebound information. Due to the often rapid action of the suspension, transducer 86 is preferably selected to be capable of a sample rate of at least 60 Hz, and more preferably 120 Hz or 240 Hz. In the preferred embodiment, transducer 86 is a Polaroid 7000 series electrostatic transducer manufactured by Polaroid, Corp. of Cambridge, Mass. Alternatively, any suitable ultrasonic transducer may be used which is constructed to transmit an ultrasonic detection signal and receive a response signal, and to generate a voltage output signal corresponding to the delay between the transmission of the detection signal and the reception of the response signal.

While front and rear sensor substructures 12 and 14 have been described above as ultrasonic transducers mounted in telescoping conduits, it will be appreciated that the invention is not limited to this embodiment and that other configurations are within the scope of the invention. For example, conduit 42 may be omitted and transducer 86, with or without housing 48, may be directly mounted adjacent the rider support frame. In such an alternative embodiment, a target may be mounted adjacent the wheel assembly or some feature of the wheel assembly itself may be used as a target surface. As another example, the conduit may be mounted in any of a number of alternative locations and orientations to measure various directional components of the compression and rebound of the motorcycle suspension.

Furthermore, another method of measuring the compression and rebound of the motorcycle suspension may be substituted in place of the ultrasonic transducer. In one such alternative embodiment, a first region of the vehicle suspension is marked or labeled with an optical, electrical, and/or magnetic indicia which is readable by a scanning device mountable adjacent a second region of the vehicle suspension. The first region is movable in relation to the second region or vice versa. The scanning device is configured to scan the indicia and measure the relative movements of the first and second regions.

Figure 14:
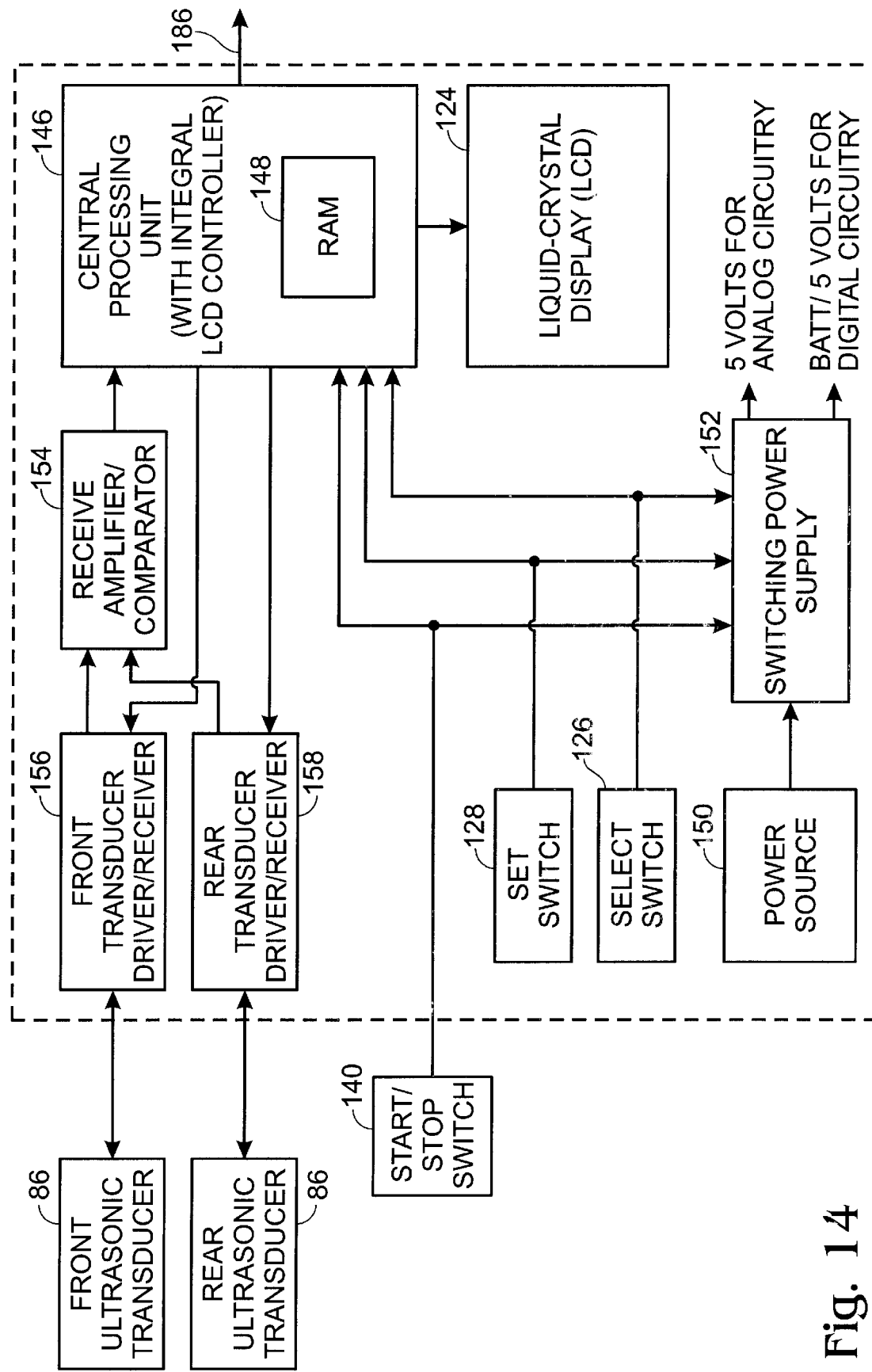
FIG. 14 is a schematic of the electronic components of a CPD unit according to the present invention.

Regardless of the sensor structure configuration, CPD unit 16 receives and analyzes the suspension related information from the sensor substructures and converts the information into various forms of suspension-analysis information. As illustrated schematically in FIG. 14, the CPD includes a central processing unit (CPU) operatively connected to a power source 150 via a switching power supply 152. Power source 150 is preferably three 1.5 volt AA batteries connected in series. Power supply 152 provides the necessary power to both the digital and the analog components of the CPD unit through the CPU.

CPD unit 16 preferably includes a front transducer driver/receiver 156 which supplies power to, and receives output voltage signals from, transducer 86 of front sensor substructure 12. Similarly, the CPD includes a rear transducer driver/receiver 158 which supplies power to, and receives output voltage signals from, transducer 86 of rear sensor substructure 14. It will be understood that in an embodiment in which suspension monitoring system 10 is used with a vehicle having more than two wheel assemblies, CPD unit 16 may be configured to have more than two transducer driver/receivers.

In any event, the output voltage signals received by the driver/receivers are then sent to receive amplifier/comparator 154. Amplifier/comparator 154 acts as both a noise filter and an amplifier. The comparator portion filters out signals of less than a predetermined signal strength to prevent background noise from being misidentified as an output signal. The output of the comparator is then amplified to the input voltage levels required by CPU 146.

CPU 146 is configured to receive the voltage signals from amplifier/comparator 154 and to calculate desired suspension-analysis information from the signals. CPU 154 includes a timing circuit (not shown) to measure the length of the time delay between the detection signal and the response signal. The CPU then calculates the distance between transducer 86 and target surface 98 as described above, based on a known value for the speed of sound. Preferably, CPU 146 is capable of resolving changes in distance values of 0.01 inch. In any event, CPU 146 preferably includes an information storage device such as Random Access Memory (RAM) 148 to store a plurality of distance values for a desired period of motorcycle operation. In an alternative preferred embodiment, information storage device 148 has sufficient capacity to store the distance values of multiple periods of motorcycle operation.

It will be appreciated that the capacity of information storage device 148 will depend on the sample rate of the transducer since a sample rate of 120 Hz will generate twice the number of distance values for a given period of operation as will a sample rate of 60 Hz. Furthermore, the number of sensor assemblies from which compression information is received will also affect the amount of vehicle operation time for which data can be stored. For example, assuming all wheel assemblies are monitored and equal sample rates, a given information storage device will be capable of storing the distance values from a motorcycle for twice as long as from a four-wheel vehicle.

In the preferred embodiment, CPU 146 functions as a user interface and is controllable by the operator through select switch 126 and set switch 128 to display suspension-analysis information to the motorcycle operator on display device 124. Display device 124, which is connected to, and controlled by the CPU unit, may be any of a number of display devices such as a liquid-crystal display (LCD), a light emitting diode (LED) display, a mechanical dial display, etc. As discussed in more detail below, the rider preferably selects from among a plurality of display modes to view various types of suspension-analysis information derived from the calculated distance values. The suspension-analysis information is usable to determine necessary adjustments to the suspension.

Figure 10:
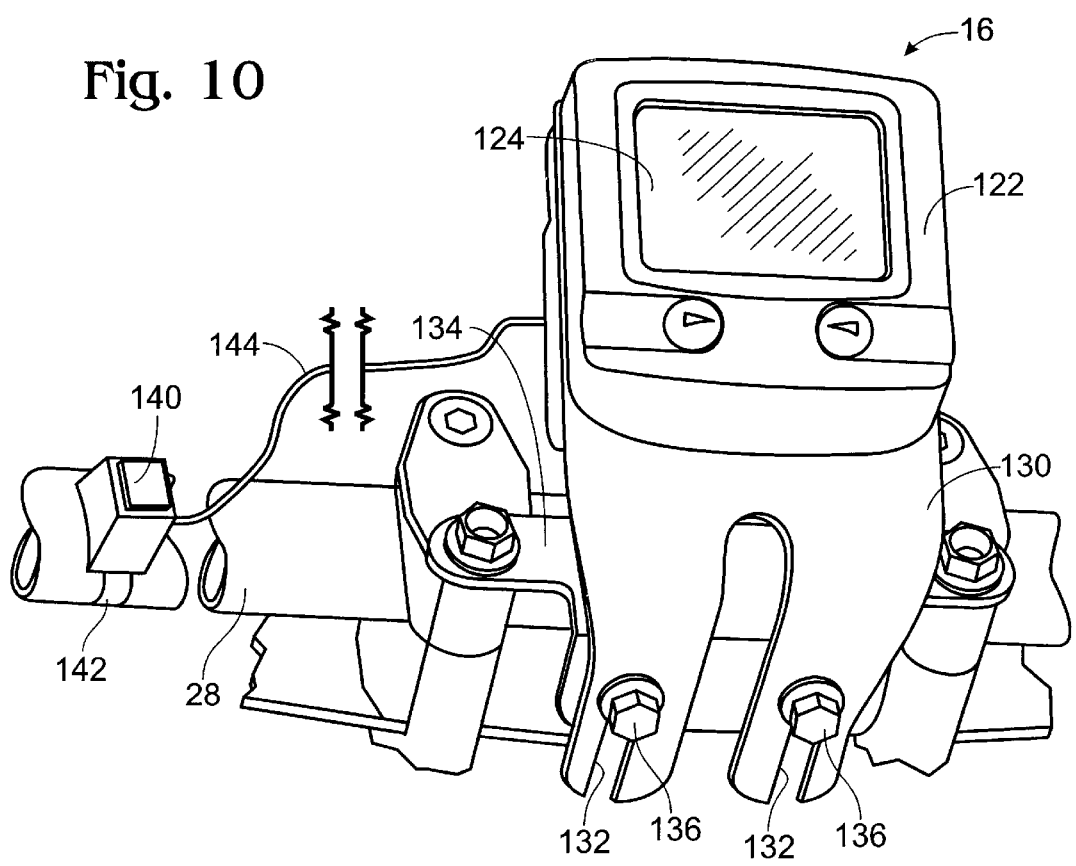
FIG. 10 is a fragmentary, greatly enlarged isometric view of the control/processing/display (CPD) unit of the present invention depicted in FIG. 1 on the handlebar of a motorcycle.

As shown in FIG. 10, the CPD unit includes housing 122 which is rigidly mounted on adjustable bracket 130 and configured to provide a weather-tight enclosure for display device 124 and the CPD electronics described above. Preferably, handlebar 28 includes CPD mount 134 which is constructed to support the CPD unit. Screws 136 pass through slots 132 in the adjustable bracket and engage holes (not shown) in the CPD mount to hold the adjustable bracket against the CPD mount. Slots 132 allow the CPD unit to be adjusted to an optimal viewing position by the rider.

In the preferred embodiment, CPD unit 16 includes a remote start/stop switch 140 which allows the rider to start or stop the CPD unit without moving his or her hands from the motorcycle controls. Start/stop switch 140 is attached to handlebar 28 with strap 142 and transmits control signals to CPD unit 16 via cable 144. Alternatively, start/stop switch 140 may be incorporated into housing 122.

Figure 12:
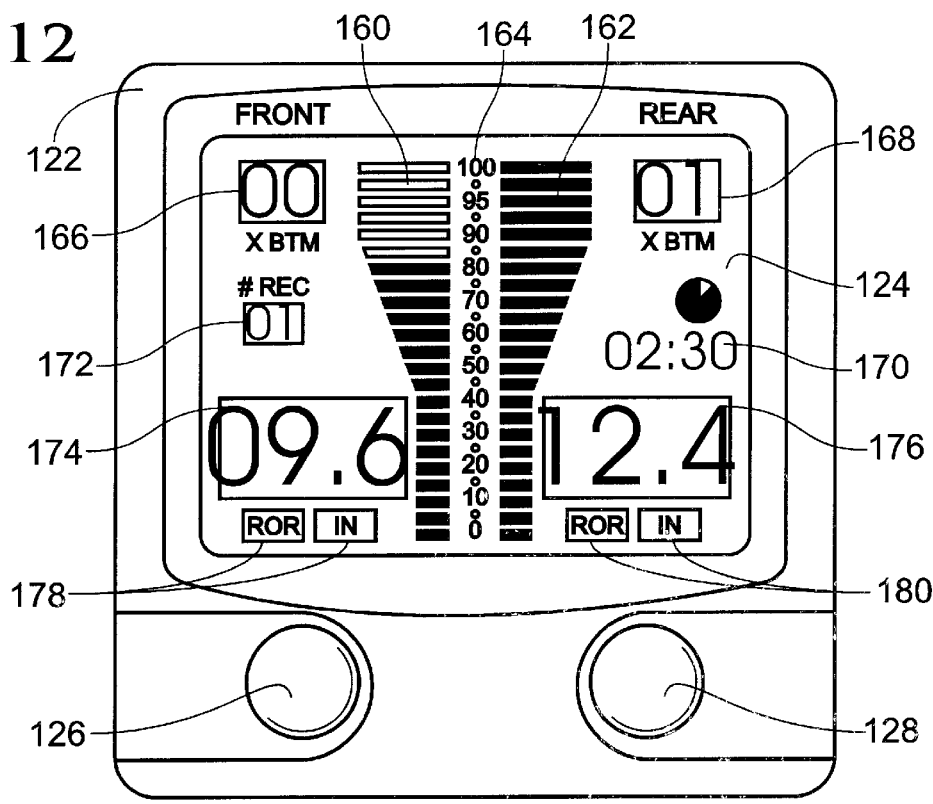
FIG. 12 is a top plan view of the CPD unit of FIG. 11 showing the change in display readouts for changed suspension conditions.
Figure 5:
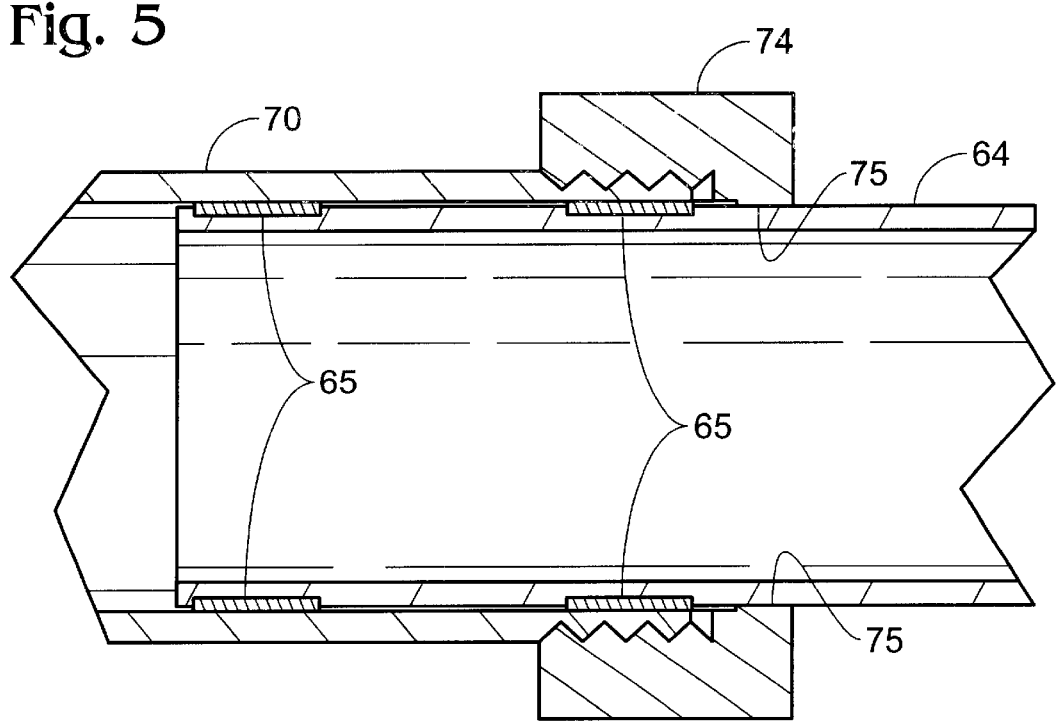
FIG. 5 is a fragmentary, greatly enlarged cross-sectional detail view of the sensor structure showing the extension limiting mechanism of the sensor substructure.
Figure 11:
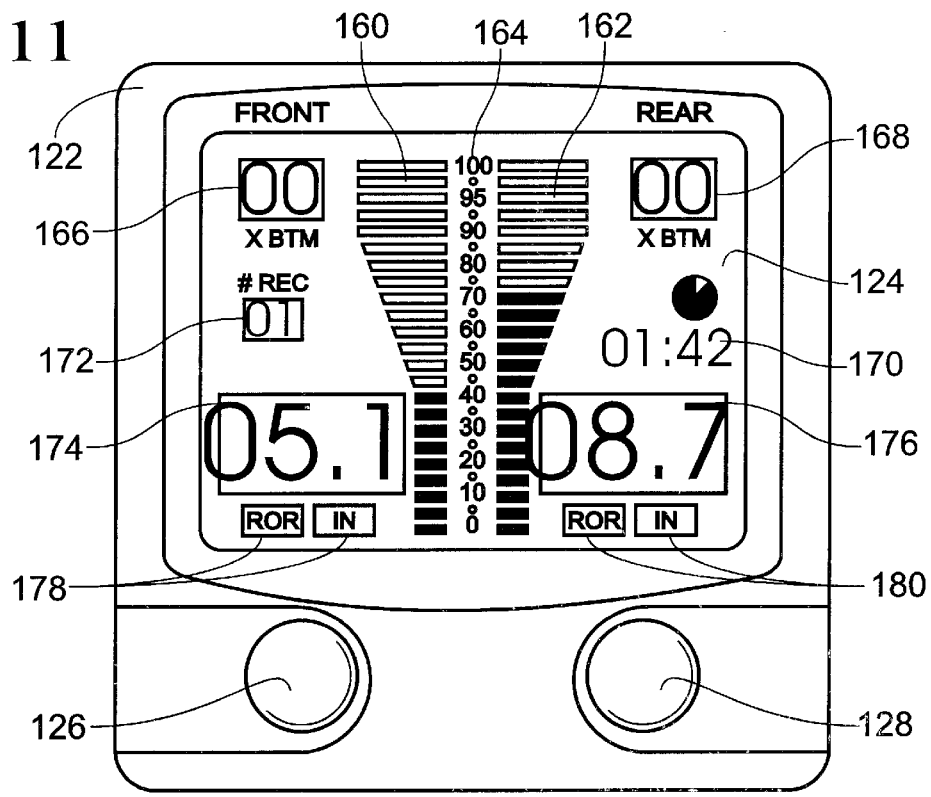
FIG. 11 is a top plan view of the CPD unit of FIG. 10 showing the operator controls and display features, and including sample display readouts for a suspension condition of a motorcycle.

Referring now to FIGS. 11 and 12, various components of the suspension-analysis information are displayed to the rider on display device 124. In the preferred embodiment, display device 124 includes timer 170, front compression bar graph 160, rear compression bar graph 162, and percentage compression scale 164. Timer 170 indicates the elapsed time of the current measurement period. Compression bar graphs 160 and 162 display the percentage of compression of the front and rear suspension assemblies respectively. When the bar graphs indicate zero percent compression, the respective suspension assemblies are fully extended. Conversely, when the bar graphs indicate 100 percent compression, the respective suspension assemblies are fully compressed.

It will be appreciated that during a desired period of operation, the amount of compression for both the front and rear suspension assemblies will continuously vary and, thus, the respective bar graph displays will likewise vary. This varying display can be seen by comparing FIGS. 11 and 12. In FIG. 11, at time "1:42," the front suspension assembly is indicated to be at approximately "40" percent compression while the rear suspension assembly is indicated to be at approximately "70" percent compression. Subsequently at time "2:30" shown in FIG. 12, the front suspension assembly is indicated to be at approximately "80" percent compression while the rear suspension assembly is indicated to be at approximately "100" percent compression.

In the preferred embodiment, display device 124 also includes full compression counters 166 and 168 which indicate the occurrences of 100 percent compression or "bottoming" of the front and rear suspension assemblies, respectively. This feature is illustrated in FIG. 12 in which rear full compression counter 168 has been incremented from "00" to "01" as a result of the 100 percent compression of the rear suspension assembly.

In the alternative embodiment in which information storage device 148 has the capacity to store distance values for multiple periods of motorcycle operation, the information from each operation is stored as a separate record. The motorcycle rider operates CPD unit 16 using select switch 126 and/or set switch 128 to select which period is being stored or displayed by selecting the associated record. Record number indicator 172 shows which record is currently active. It will be appreciated that when a new record is accessed, timer 170 and full compression counters 166 and 168 are preferably reset to zero. This multiple record feature allows the rider to repeat a test run over a desired course after making adjustments to the suspension and then compare the suspension-analysis information from the two runs to evaluate the effect of the adjustments.

In the preferred embodiment, display device 124 also includes front multi-function readout 174 and rear multi-function readout 176. Readouts 174 and 176 display any of several components of the suspension-analysis information as selected by the rider using switches 126 and/or 128. The component selected for display is indicated by front display mode indicator 178 and rear display mode indicator 180, respectively. Preferably, readouts 174 and 176 display the same components of the front and rear suspension-analysis information sets. Alternatively, readout 174 displays one component of the front suspension-analysis information while readout 176 displays a different component of the rear suspension-analysis information. As a further alternative, readouts 174 and 176 display different components of either the front suspension-analysis information or the rear suspension-analysis information.

One component preferably selectable for display on readouts 174 and 176 is "inches of travel" (IOT). When this display mode is selected, readout 174 displays the real-time distance (in inches) between transducer 86 and target surface 98 of the front sensor substructure. Readout 176 displays a similar value for the rear sensor substructure. This display mode is illustrated in FIGS. 11 and 12 in which readouts 174 and 176 display quantitative values corresponding to the graphical representations of front compression bar graph 160 and rear compression bar graph 162, respectively.

In addition, the component "rate of compression" (ROC) is also preferably selectable for display on readouts 174 and 176. CPU 146 is configured to calculate ROC by dividing the increase in IOT between successive distance values by the elapsed time between the distance values. The component ROC is useful in determining necessary adjustments to the compression circuit of a suspension. Similarly, the component "rate of rebound" (ROR) is useful in determining adjustments in the rebound circuit of a suspension. CPU 146 is preferably configured to calculate ROR by dividing the decrease in IOT between successive distance values by the elapsed time between the distance values. As discussed above, the rider operates switches 126 and/or 128 to select among ITU, ROC, or ROR as the display mode of readouts 174 and 176.

It will be appreciated that there are many components of suspension performance which are helpful in adjusting a suspension and which can be displayed on readouts 174 and 176. Thus, the specific examples discussed above are intended as illustrative only and should not be read as limiting the claimed invention.

In the preferred embodiment, CPD unit 16 is also operable to calibrate the calculations used to convert the input voltage signals into suspension-analysis information. During the manufacturing process, CPD unit 16 is programmed to store the exact distance between the transducer and the target surface when the conduit is fully retracted. Thus, the operator can calibrate the speed of sound under current temperature and humidity conditions by disconnecting either the proximal end of the conduit and/or the distal end, fully retracting the conduit, and operating the CPD unit to make a calibration measurement. The CPD is configured to conduct a distance measurement as described above, and then compare the measured transducer-to-target distance to the stored distance. If the two values are unequal, the CPD unit adjusts its stored value for the speed of sound accordingly. It will be appreciated that the same calibration method could be performed using a known distance value for the conduit when fully extended.

In addition to changes in sound speed, the system is preferably also configured for calibration of suspension travel. After calibrating the speed of sound (if desired), the operator can calibrate the zero compression distance by placing the vehicle on a support such that all compressive force is removed from the suspension, and then operating the CPD unit to take a distance measurement and store that value as zero compression. Similarly, the operator can calibrate the full compression distance by forcing the suspension into full compression and then operating the CPD unit to take a distance measurement and store that value as full compression.

Figure 13:
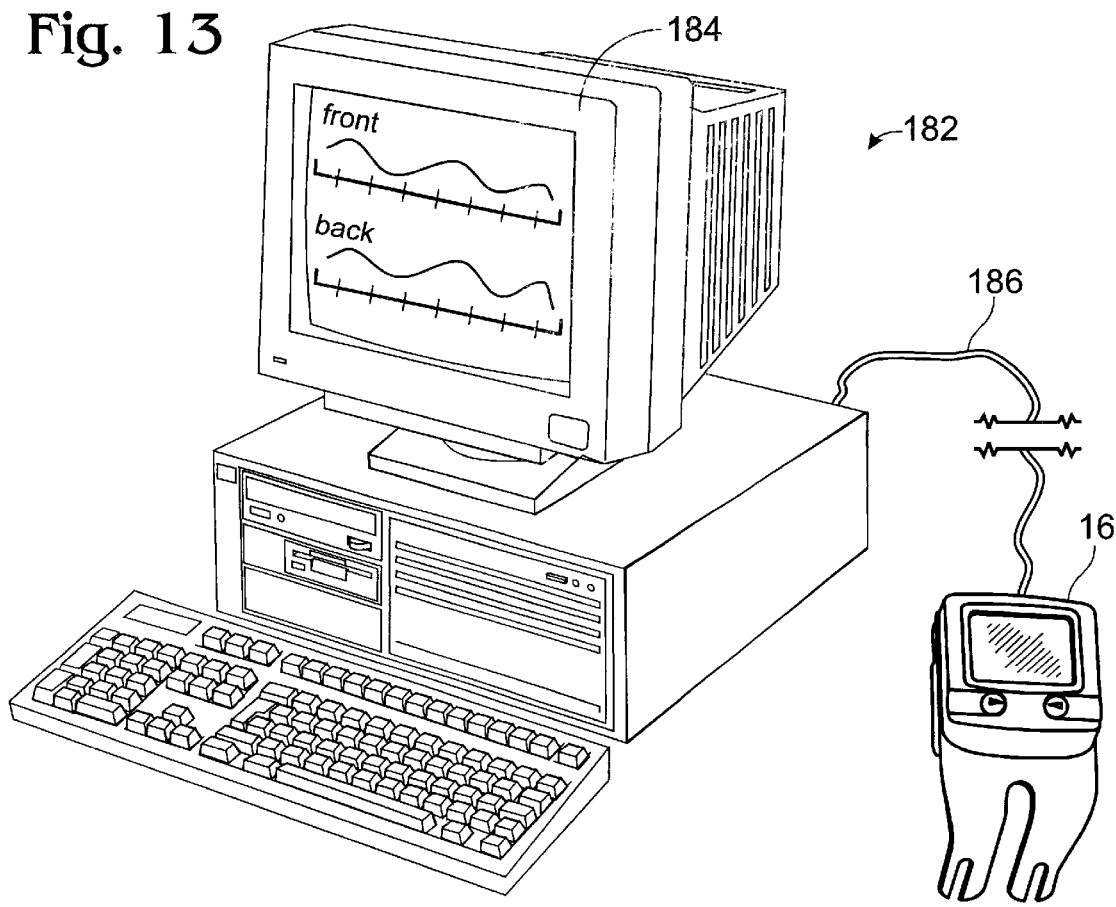
FIG. 13 is an isometric view of the CPD unit connected to download suspension-analysis information to a digital computer (shown in a perspective view) for display as waveform information.

The embodiment of the invention described above enables a first phase of operation in which suspension-analysis information is generated for a vehicle suspension and displayed on a vehicle-mountable display device for use in determining adjustments to the vehicle suspension. FIG. 13 illustrates a second phase of operation in which the suspension analysis information is downloaded to a remote computer for further analysis and manipulation.

As shown in FIG. 13, the preferred embodiment of suspension monitoring system 10 also includes digital computer 182 which is connectable to CPD unit 16 and configured to download the suspension-analysis information from the CPD unit. Computer 182 includes a communications cable, such as RS-232 cable 186 for connecting to the CPD unit. In one embodiment, cable 186 includes a union connector (not shown) to facilitate connection of the CPD unit and the computer.

Computer 182 is preferably configured to store the suspension-analysis information in a data storage device (not shown) such as RAM, hard-disk, floppy-disk, CD-ROM, etc. In any event, computer 182 is configured to allow an operator to view additional components of the suspension-analysis information on display monitor 184. In the preferred embodiment, computer 182 is configured to convert the suspension-analysis information into waveform data and display the waveform data to the operator on display monitor 182. This embodiment is illustrated in FIG. 13, in which the distance values for front and rear sensor substructures are displayed as time-dependent waves over a desired period of motorcycle operation.

The waveform data allows the operator to see the performance of a motorcycle suspension over a selected period of motorcycle operation rather than one data point at a time. In a preferred embodiment, computer 182 is configured to allow the operator to select the time scale and/or the compression scale of the waveform display, thereby "zooming in" or "zooming out" on a specific portion of the waveform. Using waveform data, an operator can determine whether a particular suspension is properly "tuned" so that the system fully rebounds between successive compression events without excessive bouncing. Additionally, an operator can determine whether a suspension is effectively utilizing its full range of compression without excessive bottoming.

Computer 182 also preferably includes a user interface to allow the operator to calculate selected values and execute selected commands to manipulate the suspension-analysis information to determine necessary adjustments to the motorcycle suspension. For example, in one preferred embodiment, computer 182 is controllable to determine the slope between two points of the waveform data which are selectable by the operator. In another embodiment, the computer is controllable to determine the amount of operational time a suspension remains above or below a certain level.

Additionally, the computer is preferably configured to allow the operator to control the display of the suspension-analysis information using VCR-type controls to PLAY, PAUSE, FAST FORWARD, and REWIND the display of the information.

It will be appreciated that a wide range of computations, features, and displays are possible with computer 182 depending on the needs of the operator and the configuration of the suspension. Moreover, computer 182 preferably acts as a large capacity storage device for storing suspension-analysis information for a plurality of vehicles and terrain.

As described above, vehicle-mountable, suspension monitoring system 10 provides a method of determining adjustments to the suspensions of a wide variety of vehicles. After mounting the sensor structure and CPD unit onto the vehicle and connecting cables 92, system 10 is ready to measure and display suspension-analysis information for a desired period of vehicle operation. The vehicle operator then activates the CPD unit with start/stop switch 140, selects the desired operational mode using switches 126 and 128, and begins operating the vehicle across an irregular terrain.

Sensor substructures 12 and 14 sense the movement of wheel assemblies 34 and 36 relative to operator support frame 22 and transmit the information to CPD unit 16. The CPD unit receives the suspension related information from the sensor substructures and calculates the distance values between transducers 86 and the associated target surfaces 98. The distance values, also referred to herein as suspension-analysis information, are stored in information storage device 148. The CPD then converts the distance values into various components of suspension-analysis information and displays the selected components to the vehicle operator on display device 124.

After completion of the desired period of vehicle operation, the operator can cause the CPD unit to playback the stored suspension-analysis information. Alternatively, the operator may cause the CPD unit to playback suspension-analysis information which was stored during a previous period of vehicle operation. In any event, the operator employs switches 126 and/or 128 to select among the various components of suspension-analysis information to be displayed, including the amount of compression or IOT, ROC, ROR, number of occurrences of full compression, etc.

Additionally, the vehicle operator may connect the CPD unit to digital computer 182 and download the suspension-analysis information stored on information storage device 148 to the computer for display on display monitor 184 as a waveform. Further, the operator may configure computer 182 to calculate and/or display additional components of the suspension-analysis information.

While the invention has been disclosed in its preferred form, the specific embodiments thereof as disclosed and illustrated herein are not to be considered in a limiting sense as numerous variations are possible. Applicants regard the subject matter of their invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of applicants' invention.

We claim:

1. For a vehicle having a rider support frame coupled to at least the wheel assembly by a vehicle suspension, the vehicle suspension having a compression circuit and a rebound circuit to allow the wheel assembly to move relative to the rider support frame, sensor structure for measuring the compression and rebound of the vehicle suspension, the sensor structure comprising:

a transducer mountable adjacent such rider support frame, the transducer being configured to transmit a detection signal;

a target mountable adjacent such wheel assembly and configured to receive the detection signal transmitted by the transducer and to return a response signal;

wherein the transducer is further configured to receive the response signal from the target, and wherein a time delay between the transmission of the output signal by the transducer and the reception of the return signal by the transducer is proportional to a distance between the transducer and the target; and wherein the transducer is further configured to generate one or more output signals corresponding to the time delay;

wherein the sensor structure further comprises a variable length conduit having a proximal end connected adjacent such rider support frame, and a distal end connected adjacent such wheel assembly, and where the detection signal and the response signal propagate at least partially within the conduit.

2. The sensor structure of claim 1, wherein the target is within the conduit.

3. The sensor structure of claim 1, wherein the transducer is within the conduit.

4. The sensor structure of claim 1, wherein the target includes an air vent to allow air to flow into and out of the conduit.

5. The sensor structure of claim 1, wherein the conduit includes a plurality of concentric, telescoping segments.

* * * * *